UNITED STATES PATENT OFFICE.

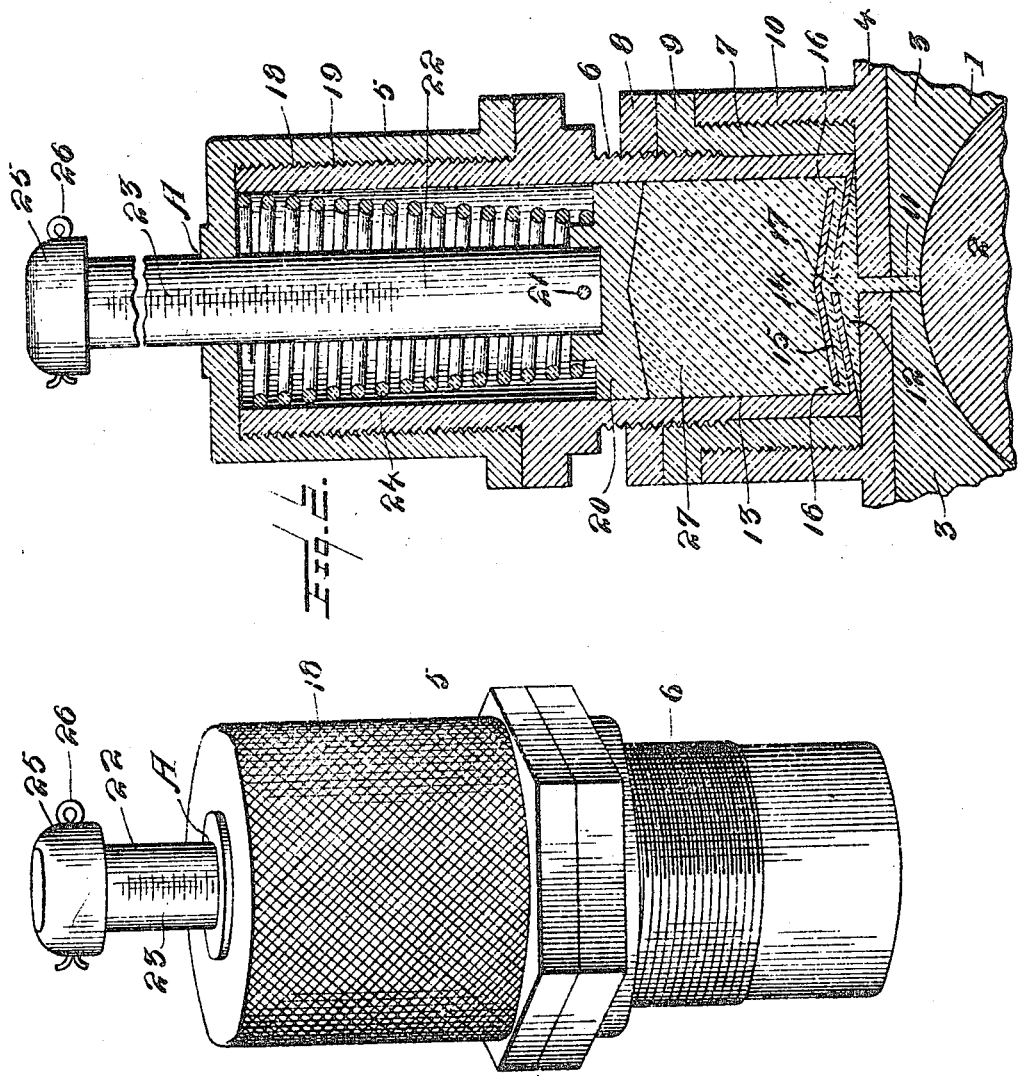

THOMAS G. KINCAID, OF CONNELLSVILLE, PENNSYLVANIA.

LUBRICATING DEVICE.

960,341.

Specification of Letters Patent.   Patented June 7, 1910.

Application filed June 30, 1909.   Serial No. 505,233.

*To all whom it may concern:*

Be it known that I, THOMAS G. KINCAID, a citizen of the United States, residing at Connellsville, in the county of Fayette and State of Pennsylvania, have invented a new and useful Improvement in Lubricating Devices, of which the following is a specification.

My invention relates to grease cups or lubricating devices in which the lubricating material in the form of a semi-solid stick or cartridge is automatically fed to the journal box or bearings to be lubricated, where it becomes liquefied by the heat of friction.

The object of my invention is to produce a device of this character whereby the lubricating cartridge or stick is automatically and continuously discharged under spring pressure, upon the bearings as same may be exhausted by the action of the bearings.

Another object of my invention is to provide means for measuring and indicating the quantity of lubricant contained within the cup, and a further object thereof is to provide an indirect channel communicating from the grease chamber to the bearing parts whereby the tendency of the action of the bearing parts to liquefy the grease and thereby consume and exhaust the same more rapidly than is required for sufficient lubrication of the parts is overcome and an economy of the grease thus effected and increasing the period that each charge may be used without replenishing.

To these ends, my invention includes the combination and arrangement of component parts to be hereinafter described and more particularly pointed out in the claims.

In the accompanying drawings illustrating my invention, in which like characters indicate similar parts, Figure 1 is a perspective view thereof, and Fig. 2 is a vertical sectional view with the grease chamber charged with lubricant.

My invention includes, generally, a grease reservoir adapted to contain a stick of semi-solid lubricant, having a conical bottom, which forms in the concave side an auxiliary grease chamber beneath the reservoir, channels in said bottom leading from the lower outer edge of the bottom and discharging into the auxiliary chamber at the apex of the cone, a cap for said reservoir adjustably secured thereon and having an opening at the top, a spring pressed plunger carried within said reservoir having a graduated stem projecting through the opening in the cap adapted to indicate the quantity of grease contained therein.

Referring to the drawings, 1 designates a moving journal box used for connecting rods, 2 indicates the crank pin, 3, the brasses and 4 the strap whereby the brasses are confined and secured to the driving shaft.

5 designates my grease cup, which, as shown, is preferably of cylindrical form, having its lower exterior screw threaded at 6 to receive the bushing 7 and jam nut 8. Said bushing is internally and externally threaded and is provided with the angular nut head 9. As shown in the drawings, the bushing is screwed into an annular collar 10 on the strap 4, and the cup 5 is screwed down into the bushing until its lower end is adjacent to or rests upon the strap. A lubricant channel 11 communicates through the journal box with the auxiliary grease chamber 12 and the crank pin 2.

The grease cup 5 is provided with a conical bottom 14 above which is formed the grease reservoir 13 and below the same, formed by the cavity in the bottom is the auxiliary chamber 12. The grease chamber 13 communicates with the auxiliary chamber 12 through the channels 15 in the conical bottom 14, which, as shown, are open to the upper reservoir at the lower outer edge at 16 and discharge through an opening 17 at the under side of the apex into the lower or auxiliary chamber.

The grease reservoir 13 is closed by a cap 18 which telescopes the exterior of the grease cup and is screwed thereon by internal threads coacting with threads 19. Other suitable adjustable attaching means may be employed for the same purpose, such as bayonet slots and lugs, but I have only illustrated the means described. The top of the cap is provided with an opening at A to accommodate the stem of the plunger hereinafter described.

Carried within the grease chamber 13, I provide an annular plunger 20 which snugly fits therein, upon which is secured by a pin 21, a stem 22 which projects through the opening in the top of the cap 18, and is provided with a series of graduations 23 adapted to indicate the supply of grease contained in the reservoir. The said plunger is normally pressed downwardly by the helical spring 24 interposed between the same and the top of the cap.

A head 25 may be removeably secured by the pin 26 upon the outer end of the stem.

In operation, the cap may be removed from the cup and a charge of grease, preferably a stick of semi-solid lubricant 27, placed therein. The plunger is placed in the reservoir above the lubricant and the cap secured upon the cup, which compresses the spring above the plunger and projects the stem through the top of the cap.

In devices of this character as heretofore constructed, great difficulty has been encountered in regulating the feed or discharge of the grease so as to adaquately supply the bearings and avoid the waste thereof. To prevent too rapid discharge by which the grease is wasted, I provide the indirect discharge thereof under the pressure of the spring through the channels in the conical bottom into the auxiliary chamber and thence into the bearings. By such structure it will be apparent that the friction and jarring of the parts will not melt and discharge the grease more rapidly than is required for adequate lubrication, thus economizing in the use of grease and extending the period for which one charge will operate without replenishing, and at the same time insuring a sufficient supply to properly lubricate the bearings. The auxiliary chamber also prevents the heating of the bearings if the exhaustion from the reservoir is not immediately observed and replenished by retaining the reserve supply contained therein.

Having thus described my invention, what I claim as new and desire to be secured by Letters Patent, is—

1. A lubricating device, comprising a cylindrical cup having a conical bottom dividing said cup into an upper grease reservoir and lower auxiliary grease chamber, said conical bottom being provided with channels communicating with the upper reservoir through openings in the outer edge of the conical bottom and discharging through an outlet at the apex of the conical bottom into the lower auxiliary chamber, a cap for said cup, and means for automatically discharging grease from the cup, substantially as described.

2. A lubricating device, comprising a cylindrical cup having a conical bottom dividing the cup into an upper grease reservoir and lower auxiliary grease chamber, said conical bottom being provided with channels communicating with the upper reservoir through openings at the outer edge of the conical bottom and discharging through an outlet at the apex of the conical bottom into the lower auxiliary chamber, a cap adjustably secured upon said cup provided with a central opening in its top, a spring-pressed plunger carried in said grease reservoir adapted to bear upon and discharge the grease therefrom, and a graduated stem secured upon said plunger and projecting through the opening in said cap, adapted to indicate the quantity of grease contained in the reservoir substantially as described.

In testimony whereof, I have hereunto signed my name to this specification in the presence of two subscribing witnesses.

THOMAS G. KINCAID.

Witnesses:
S. A. LONGHAMMER,
F. M. COCKRELL.